Patented Mar. 27, 1923.

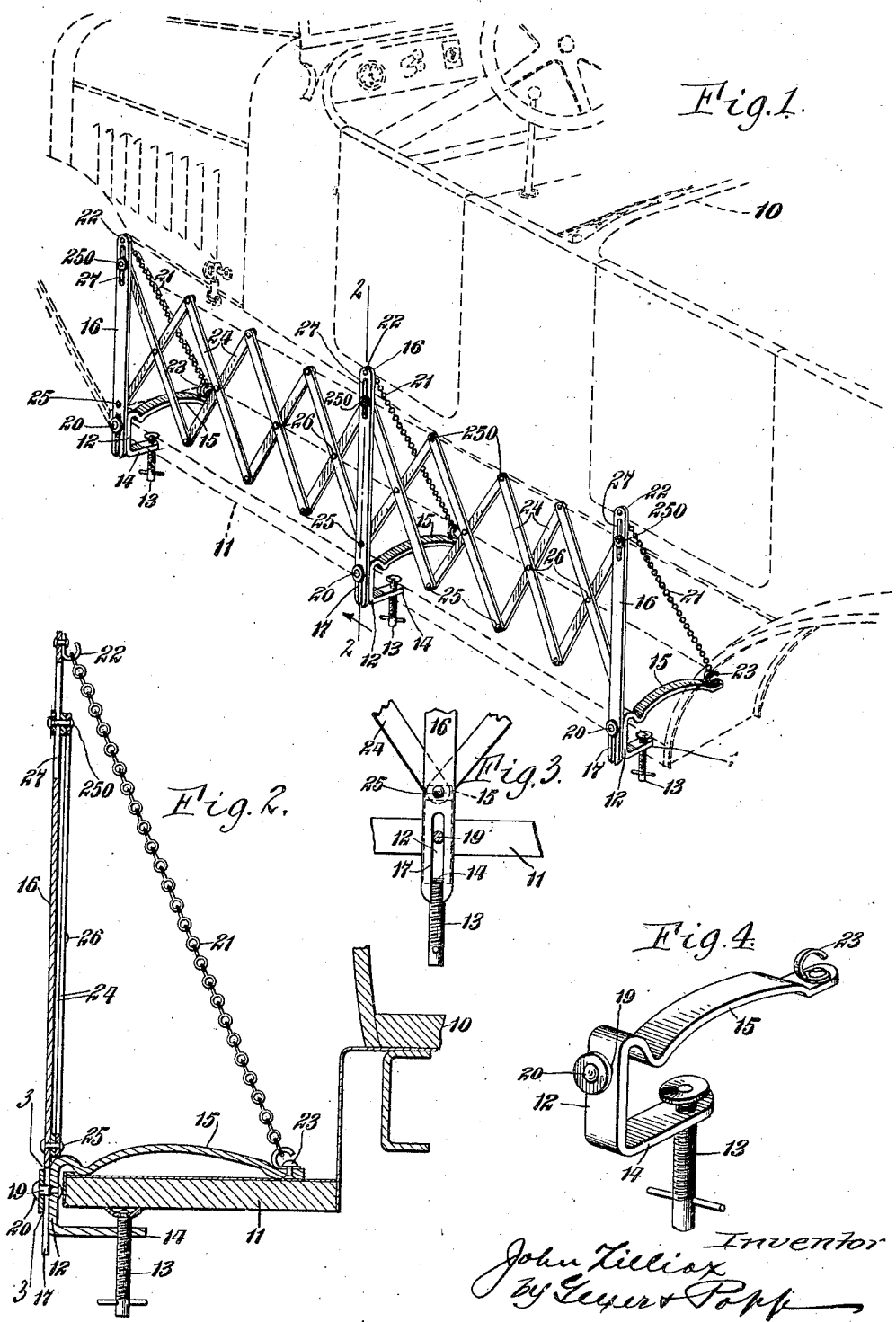
Mar. 27, 1923.
J. ZILLIOX.
LUGGAGE CARRIER FOR AUTOMOBILES.
FILED NOV. 1, 1920.
1,449,481.

1,449,481

UNITED STATES PATENT OFFICE.

JOHN ZILLIOX, OF ORCHARD PARK, NEW YORK.

LUGGAGE CARRIER FOR AUTOMOBILES.

Application filed November 1, 1920. Serial No. 420,948.

*To all whom it may concern:*

Be it known that I, JOHN ZILLIOX, a citizen of the United States, residing in Orchard Park, in the county of Erie and State of New York, have invented new and useful Improvements in Luggage Carriers for Automobiles, of which the following is a specification.

This invention relates to an auxiliary means of carrying valises and other luggage on an automobile.

One of the objects of the invention is to produce a device of this character in which the main portion thereof may be quickly and easily removed, without disturbing the portion which is adapted to be clamped directly to the automobile itself. A further object of the invention is to distribute any strain which may be imposed upon any one part of the carrier to other parts of the carrier and to facilitate and make more convenient the stowage of the removable part of the luggage carrier.

In the accompanying drawings: Figure 1 is a perspective view of the complete luggage carrier as applied to an automobile running board and ready for use. Figure 2 is an enlarged vertical transverse section through the luggage carrier taken on line 2—2, Fig. 1. Figure 3 is an enlarged fragmentary vertical longitudinal section through the luggage carrier taken on line 3—3, Fig. 2. Figure 4 is an enlarged perspective view of one of the clamps with its appurtenances.

Similar characters of reference refer to like parts throughout the several views.

In Fig. 1 is indicated by dotted lines a typical automobile 10 which is provided with the customary running board 11 to which the present invention is attached. Each one of a plurality of clamps 12 is detachably secured to the said running board 11 of the automobile by means of a clamping screw 13 whose external screw thread engages with a suitable internally threaded or "tapped" hole in the lower, short arm 14 of each clamp. The upper arm 15 of each clamp is curved or arched convexly upwardly and is considerably longer than the lower arm 14 of the clamp, so that a two point bearing of the upper arm 15 upon the top surface of the running board is obtained, the outermost bearing point being closely adjacent to the outer edge of the running board 11 while the inner bearing point is at the extreme inner end of said curved arm 15. The point at which the upper end of the clamping screw 13 bears against the lower surface of the said running board is (as best shown in Fig. 2) a point which is intermediate of the two points at which the upper arm 15 bears against the upper face of said running board. This provides a construction which resists very effectually any tendency to laterally move the clamp out of position on the running board, by reason of the fact that a considerable pressure is present at the extreme inner end of said upper arm 15 and said pressure creates a considerable frictional resistance. The theoretical leverage or lever arm of this frictional resistance is very large with respect to any possible axis of rotation of the clamp as a whole, which axis would of necessity have to be located at the outer end of the clamp. It should be also noted that the upward pressure of the clamping screw 13 causes a flexure of the upper arm 15 of the clamp so that said clamp is caused to retain its firm grasp on the running board of the automobile, even though said running board be considerably warped or distorted or the clamp itself be forcibly displaced by reason of a very heavy external pressure or blow. It is obvious therefore that these clamps 12 may be made a permanent fixture of the running board, this being feasible and practical because of the impossibility of accidentally displacing the clamps and also because, when in place, the only parts of the clamps which are visible are the upper arms 15 and these do not detract from the appearance of the car; in fact the clamps are a very convenient means of holding down the ends of hemp or corrugated metal foot scrapers, with which many automobiles are now provided so as to keep the interior of the car neat and clean and free from mud and dirt. Considering the clamps as the relatively stationary and permanent portions of the improved luggage carrier, we will now take up the portable portion thereof.

An upright bifurcated standard 16 constructed of ordinary stock, bar metal is adapted to be dropped into place at the outer end of each of the clamps 12, the connection being effected by means of a longitudinal slot 17 extending centrally upwardly from the extreme lower end of each standard, said slot being adapted to receive the opposite sides of a stud or neck 19 which extends horizontally outwardly from and is secured to the companion clamp 12. The inner face of each standard bears against the flat outer face of its companion clamp 12 and is thereby restrained against inward displacement relatively thereto, the outer face of said standard engaging with a washer or otherwise enlarged head 20 which is formed at the outer end of the neck 19. Each standard is restrained against tipping or bending outwardly by means of a chain or other tension member 21 whose upper end is connected to a hook 22 in the upper end of the companion standard 16, while the lower end of the chain is detachably connected to a hook 23 at the extreme inner end of the curved arm 15 of the companion clamp. It is obvious that if this chain should become slack for any reason, the same may be unhooked at its lower end, and the companion standard 16 then pressed inwardly and any desired other link which is further removed from the end of the chain is then engaged with the said hook 23. It should be noted that the connection between each standard 16 and its companion clamp 12 substantially amounts to a pivotal connection, so that any tendency to tip the standard in a vertical plane parallel to the running board 11 does not tend to likewise rock the companion clamp so that such a strain does not tend to loosen the said clamp relatively to the running board 11, to which it is assumed to be permanently attached.

Disposed in a vertical plane above the outer longitudinal edge of said running board 11 is a geometrically associated group of levers which may be collectively termed a lazy-tong or lattice-work luggage retainer 24. Certain of the lowermost pivots 25 of this luggage retainer not only pivotally connect together the lower ends of companion pairs of levers of said luggage retainer, but are also pivotally connected to the lower parts of the standards 16. The intermediate pivots 26 of said luggage retainer 24 are not, it will be noticed, connected to said standards. The uppermost pivots 250 of said luggage retainer (similarly to the lower pivots 25) connect pivotally the upper ends of companion levers of said luggage retainer. The outermost pair and also the central pivot of said upper pivots 250 are somewhat longer than their companions and extend outwardly and horizontally through slots 27 which are formed longitudinally in the upper ends of the said standards, said elongated pivots being suitably headed at their outer ends to prevent disengagement with the said standards. Each transverse pair of upper and lower pivots 250 and 25 respectively at all times retain a position which is perpendicular to the principal axis of the said lattice-work, luggage retainer 24 of which they form a part, this being true irrespective of how much said luggage retainer is extended or collapsed. It is thus apparent that any tendency to tilt any one of the standards 16 in a plane which is parallel to said luggage retainer, will be resisted by the said luggage retainer acting in conjunction with the other standards 16. It is furthermore apparent that the said standards also are compelled at all times to retain a position parallel to each other. Thus when the luggage retainer, together with its standards, is removed as a unit from the relatively permanent clamps 12, the standards may be pressed together into very close juxtaposition with the luggage retainer, the significant feature of construction being that this collapsing operation is facilitated by reason of the fact that the standards are retained constantly in their parallel relationship during the collapsing operation. Thus said operation can only take place in one single way and that is the right way, without any possible interference between the luggage carrier and the standards, or between the standards themselves, which are constrained to fold together compactly or snugly in a substantially automatic manner. Another feature of this improved construction, is that any lateral twisting pressures on the said lattice-work luggage carrier 24 is amply resisted inasmuch as it is connected at its extreme upper and its extreme lower edge to the standards 16.

A further advantage in the construction of this luggage carrier is that the same can be folded very compactly for storage and transportation.

I claim as my invention:

1. A luggage carrier having a clamp adapted to be attached to an automobile and having a laterally projecting button provided with a reduced neck and an enlarged head, and a standard having an upright slot in its lower part which extends to the lower end thereof and which is adapted to receive the neck of said button.

2. A luggage carrier for automobiles comprising a clamp adapted to be secured to the upper and lower sides of the running board of an automobile, a standard detachably connected to said clamp and removable from the running board independently of the clamp, and a tension member connected at its upper end to said standard and at its lower end to said clamp.

3. A luggage carrier for automobiles comprising a clamp provided with upper and lower arms, the upper arm thereof being adapted to bear against the automobile at only two points, a clamping screw arranged in the lower arm of said clamp and disposed intermediately of the two points of contact of said upper arm, and a standard connected with said clamp.

4. A luggage carrier for automobiles comprising a clamp provided with a long, convexly-curved upper arm and a short horizontal lower arm, a clamping screw arranged in said lower arm, and a standard connected to said clamp.

JOHN ZILLIOX.